Figure 1:
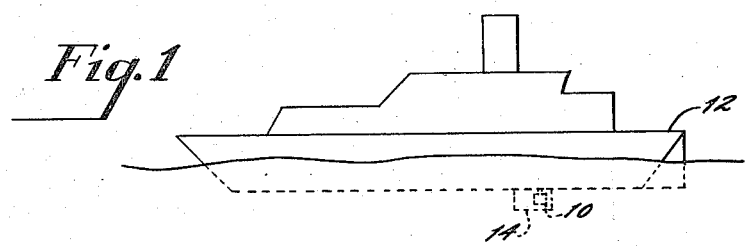

Jan. 14, 1958  J. P. O'NEILL  2,820,214
SONAR TRANSDUCERS
Filed May 28, 1949  2 Sheets-Sheet 1

INVENTOR
John P. O'Neill
BY
ATTORNEY

Jan. 14, 1958     J. P. O'NEILL     2,820,214
SONAR TRANSDUCERS
Filed May 28, 1949     2 Sheets-Sheet 2
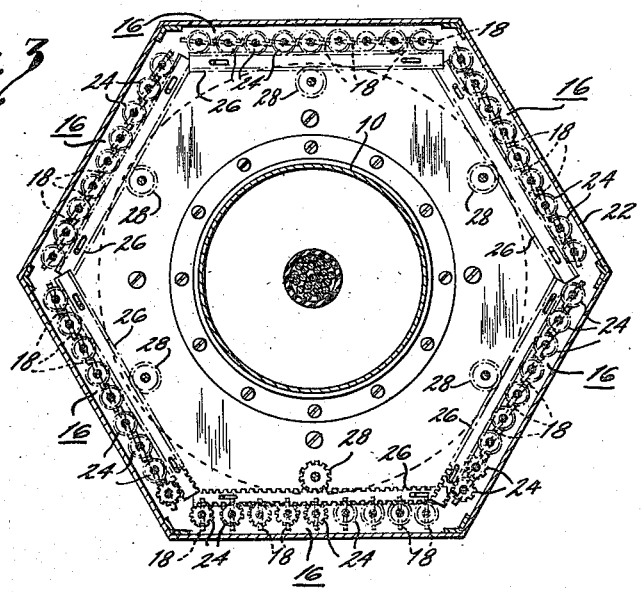
Fig. 3
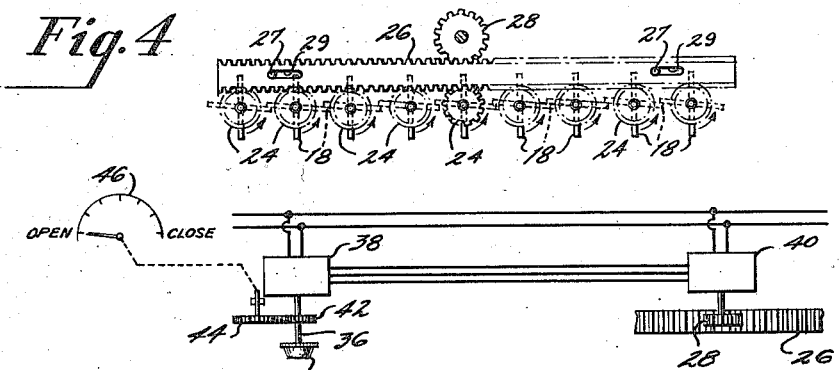
Fig. 4
Fig. 5
INVENTOR
John P. O'Neill
BY
ATTORNEY

United States Patent Office 2,820,214
Patented Jan. 14, 1958

2,820,214

SONAR TRANSDUCERS

John P. O'Neill, Chestnut Hill, Pa., assignor, by mesne assignments, to the United States of America as represented by the Secretary of the Navy Application May 28, 1949, Serial No. 96,106

3 Claims. (Cl. 340—8)

This invention relates to underwater signaling and more particularly to an improved method of, and apparatus for, determining the directional characteristics of a compressional wave transducer.

Underwater sound ranging systems generally use a compressional wave transducer, such as a magnetostrictive or piezo-electric device. In one system, the transducer transmits sound waves through water and the energy reflected from an object is received and used to determine the direction and distance of the object. In another system, or even combined with the above system, the transducer is merely used as a receiving device to pick up the underwater sounds made by other ships whose approximate location is then obtained by a form of triangulation.

In order to obtain a wider angle, or an omni-directional search pattern, it had been customary to rotate a single transducer having a single frontal lobe pattern. This was replaced by a number of transducers facing in different directions and finally by what is known as a scanning compressional wave transducer made up of many elements arranged to form a figure of revolution such as a cylinder. By controlling the electrical phasing of the elements the scanning search patterns can be made as wide or as narrow as desired.

These transducers are generally attached to the bottom of ships. It was found that, when a number of ships travelled in convoy and would attempt to use their sound ranging systems, there would be interference picked up from each other which was difficult to eliminate electrically due to its continuously shifting nature caused by the shifting of the ships' positions. Furthermore, if the complex electrical phasing system developed defects, the sound ranging system was rendered substantially ineffective to determine the direction of other ships or submarines.

It is therefore an object of this invention to provide improved apparatus to control the directional pattern of an underwater compressional wave transducer external to said transducer.

It is a further object of this invention to provide improved apparatus to control the directional pattern of an underwater scanning transducer, which apparatus is simple in construction.

It is still a further object of this invention to provide improved apparatus to control the directional pattern of an underwater scanning transducer, which apparatus is flexible and simple to operate.

It is also an object of this invention to provide improved apparatus to shield an underwater scanning transducer from undesired signals. One solution for these prior art difficulties is to provide a supplementary directional control system which is simple to operate and reliable, and which introduces no further complexities into the transducer construction and operation.

These and other objects are therefore achieved in accordance with this invention by spacing around the scanning transducer adjustable baffle sections which are coated with a compressional wave attenuating substance. These baffle sections are individually adjustable between open and close positions thus permitting a determination of both a directional pattern for the transducer as well as the portion of the transducer to be shielded from undesired signals.

Figure 2:
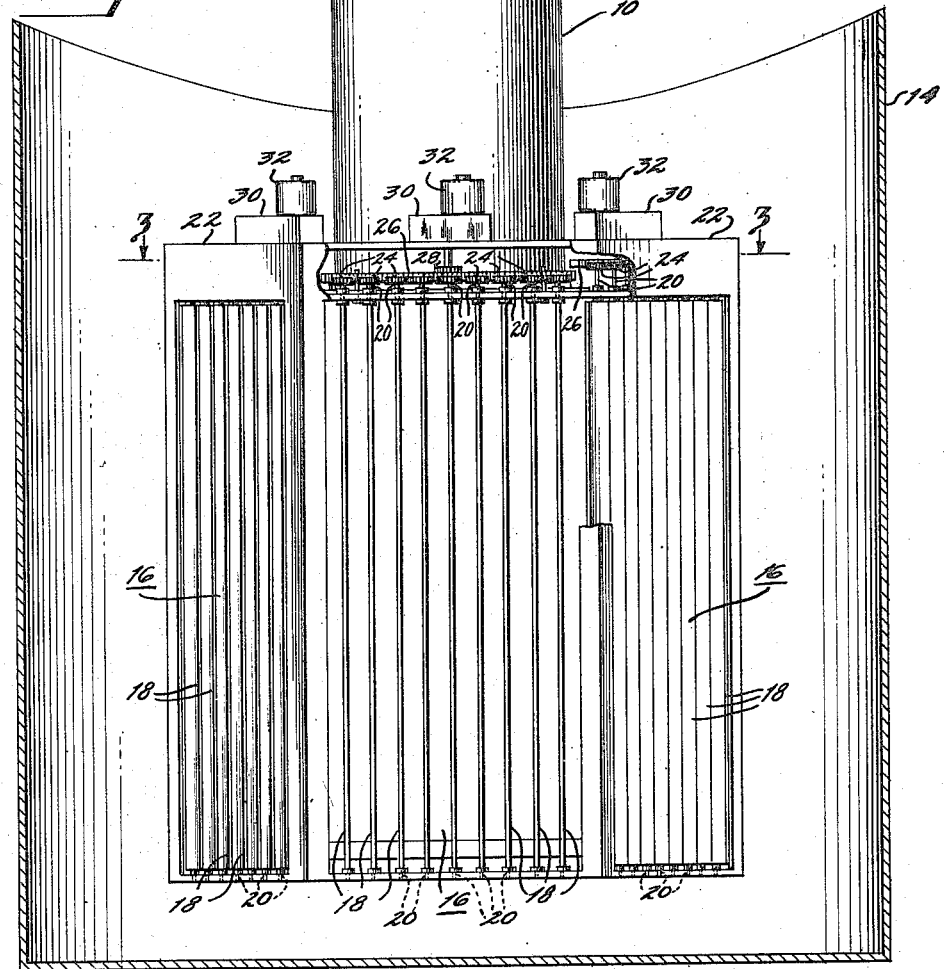

The novel features of my invention, both as to its organization and method of operation, as well as additional objects and advantages thereof, will best be understood from the following description, of an embodiment thereof when read in connection with the accompanying drawings wherein like reference characters are applied to parts having similar function and wherein, Figure 1 is a view of a ship showing the relative location of a scanning transducer under said ship, Figure 2 is a plan view of my invention, partially in section, Figure 3 is a sectional view of my invention taken along the lines 3—3 of Figure 2, Figure 4 is a view in detail of the gear apparatus for controlling the effectiveness of a section of the directional baffle, Figure 5 is a view of a system for rotating the gear apparatus of Figure 4 and simultaneously indicating the position of the staves of the baffle section.

Referring to Figure 1, there is shown a scanning transducer 10 fastened to the bottom of a ship 12. Surrounding the scanning transducer is a streamlined thin steel dome 14 which is used for the purpose of eliminating friction drag on the ship as well as the interfering noise which would be created in the transducer if it were permitted to drag through the water.

In Figure 2 of the drawings there may be seen several baffle sections 16 of my invention opposing the active area of the transducer. Each baffle section 16 consists of a number of staves 18 which are pivotally mounted at either end, by means of pivot rods 20, in offset portions of the baffle frame 22. The pivot rod 20 at the upper end of each stave 18 extends through the baffle frame offset and has attached thereto a stave gear 24. A rack gear 26 is associated with each baffle section 16 and simultaneously meshes with all the stave gears 24 in the baffle section. Each rack gear 26 is driven by a pinion gear 28 which is driven through a gear speed reduction box 30 by a motor 32.

Figure 3 of the drawings represents a view of the transducer and baffle sections taken along the section 3—3 in Figure 2. This view shows the baffle sections 16 in a hexagonal array around the transducer. The staves 18 of the lower baffle section 16 are shown in an open position and the staves 18 of the remaining baffle sections 16 are shown in a closed position. As shown, the transducer 10 will have a maximum directivity in the direction of the open baffle section, the other closed baffle sections simultaneously serving as a screen to substantially repress or block any radiation from the transducer and as a shield to protect the transducer from disturbances originating from the directions of the colsed baffle sections.

Thus, by driving the proper pinion gears 28 to operate the proper baffle sections 16, the scanning transducer 10 may easily be made directional in one or more of the directions of the six baffle sections 16 and likewise, may be shielded from noise from the direction of one or more of the six baffle sections 16. Baffle sections 16 may be arranged about the transducer to form a polygon, having as many sides as desired, to achieve given radiation patterns or shielding.

Partially opening a baffle section 16 reduces the sensitivity and radiation through the staves 18 of that baffle section.

Referring to Figure 4 of the drawings there may be seen the rack gear 26 and pinion drive 28 on the stave gears 24 of an open baffle section 16. The appearance of the staves 18 when the baffle section 16 is closed is shown by the dotted staves. As may be seen from the closed position, the staves are placed adjacent to one another at a distance slightly less than the width of the individual stave. This is done so that, when the baffle section is in the closed position, the staves will overlap each other and a positive closure is thus effectuated. A stop pin 27 extends through a suitably dimensioned limiting slot 29 in the rack gear 26 and limits the rack gear travel so that there is no overdrive on the staves 18. The limit of the open and of the close positions of each baffle section is thus positively fixed.

Figure 5 shows a system for controlling the amount of baffle area presented to the transducer, or the stave angle, while simultaneously indicating this on a meter. By turning the knob 34 which is attached by a shaft 36 to the rotor of a servo motor 38 a second servo motor 40 electrically coupled thereto is proportionately displaced. The rotor of the second servo 40 is coupled by any desired mechanical means to the pinion gear 28 associated with a baffle section 16 and the section is accordingly opened or closed.

A gear 42 on a shaft 36 meshes with a second gear 44 which is used to operate a meter 46. The dial of the meter 46 is calibrated, as desired, between the open and close positions. This indicating system is shown merely by way of example. Any other well known method for indicating the condition of the baffle may be used. One such method is electrically coupling a properly calibrated meter to the servomotors, the meter being phased to be porportionately displaced with the servos.

It has been found that if the staves are made or coated with a substance which has numerous air spaces therein, such as a mixture of cork and neoprene, the attenuation as well as the absorption without reflection of underwater compressional waves is substantially complete. It is therefore also within the scope of my invention that the staves either be made from, or coated with, a compressional wave absorbing and attenuating material. Thus, both the reflections from the closed baffle sections 16 back to the transducer 10 as well as transmission of noise through the closed baffle sections 16 to the transducer 10 are substantially reduced.

From the foregoing description it will be readily apparent that I have provided a simple and reliable mechanical baffle to determine the directionality of a scanning transducer, as well as to provide shielding therefor. The baffle is utilizable by itself or in conjunction with the electrical phasing means previously mentioned to render a scanning transducer sharply directional, without complicating either the transducer structure or use.

The transducer need not be totally enclosed by the baffle sections, but only a few baffle sections may be used and positioned or moved around the transducer to shield a required area. When traveling in convoy, or close to a shoreline, or any other source from whence interfering noise may emanate, the baffle is used to substantialy eliminate those noises and thereby prevent masking of sound from desired directions. Although I have shown and described but a single embodiment of my present invention, it should be apparent that many changes may be made in the particular embodiment herein disclosed, and that many other embodiments are possible, all within the spirit and scope of my invention. For example, the transducer need not be totally enclosed by the baffle sections, but only a few baffle sections may be used and positioned or moved around the transducer to shield a desired area thereof. Therefore I desire that the foregoing description shall be taken as illustrative and not as limiting.

What is claimed:

1. The combination with a scanning compressional wave transducer having a cylindrical active area of a polygonal baffle surrounding said cylindrical active area, said baffle comprising a plurality of pivotally mounted staves, a stave gear coaxially mounted at one end of each stave, a rack gear for each side of said polygonal baffle simultaneously engaging the stave gears in the associated side, and pinion gears respectively engaging each of said rack gears whreby the directional pattern of said transducer is determined by the setting given to each pinion gear.

2. The invention recited in claim 1 wherein said polygonal baffle is hexagonal and said staves are coated with a mixture of cork and neoprene.

3. The invention recited in claim 1 wherein there is provided, in addition, means to drive each of said pinion gears, and means coupled to each of said pinion gears to indicate the angular positions of the associated staves.

References Cited in the file of this patent

UNITED STATES PATENTS

| | | |
|---|---|---|
| 1,348,826 | Fessenden | Aug. 3, 1920 |
| 1,394,482 | Fessenden | Oct. 18, 1921 |
| 1,397,949 | Fessenden | Nov. 22, 1921 |
| 1,705,243 | Dunham | Mar. 12, 1929 |
| 1,825,465 | MacDonald | Sept. 29, 1931 |
| 2,078,302 | Wolff | Apr. 27, 1937 |
| 2,114,680 | Goldsmith | Apr. 19, 1938 |
| 2,430,568 | Hershberger | Nov. 11, 1947 |
| 2,527,222 | Iams | Oct. 24, 1950 |

FOREIGN PATENTS

| | | |
|---|---|---|
| 5,183 of 1931 | Australia | June 27, 1932 |
| 395,081 | Great Britain | July 13, 1933 |